(12) United States Patent
Lemecha et al.

(10) Patent No.: US 6,810,723 B2
(45) Date of Patent: Nov. 2, 2004

(54) ENGINE COMBUSTION MONITORING AND CONTROL WITH INTEGRATED CYLINDER HEAD GASKET COMBUSTION SENSOR

(75) Inventors: Myron Lemecha, Dearborn, MI (US); Jay Baker, West Bloomfield, MI (US); Achyuta Achari, Canton, MI (US); William D. Hopfe, Farmington Hills, MI (US); Lakhi N. Goenka, Ann Arbor, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 101 days.

(21) Appl. No.: 10/230,485

(22) Filed: Aug. 28, 2002

(65) Prior Publication Data

US 2003/0074957 A1 Apr. 24, 2003

Related U.S. Application Data

(60) Provisional application No. 60/330,306, filed on Oct. 19, 2001.

(51) Int. Cl.[7] .............................................. G01M 15/00
(52) U.S. Cl. ........................................................ 73/116
(58) Field of Search .......................... 73/115, 116, 117.3, 73/35.07; 60/323; 277/317, 596, 601, 593; 250/227.17, 554; 385/13

(56) References Cited

U.S. PATENT DOCUMENTS

| | | | |
|---|---|---|---|
| 3,978,720 A | 9/1976 | Ford | |
| 4,393,687 A | 7/1983 | Müller et al. | |
| 4,422,323 A | 12/1983 | Linder et al. | |
| 4,468,044 A | * 8/1984 | Ulmer et al. | ................ 277/596 |
| 5,380,014 A | 1/1995 | Schaperkotter | |
| 5,384,467 A | 1/1995 | Plimon et al. | |
| 5,659,132 A | 8/1997 | Novak et al. | |
| 5,693,936 A | 12/1997 | Komachiya et al. | |
| 5,745,611 A | 4/1998 | Komachiya et al. | |
| 5,831,263 A | 11/1998 | Komachiya et al. | |
| 5,936,235 A | 8/1999 | Minamitani et al. | |
| 6,301,957 B1 | 10/2001 | Sakaguchi et al. | |
| 6,532,737 B1 | * 3/2003 | Kozerski et al. | ............... 60/323 |
| 6,649,924 B1 | * 11/2003 | Philipp et al. | ............... 250/554 |

FOREIGN PATENT DOCUMENTS

| | | |
|---|---|---|
| DE | 40 14 502 A1 | 11/1991 |
| DE | 198 23 594 A1 | 12/1998 |

OTHER PUBLICATIONS

Combined Search and Examination Report, dated Jun. 20, 2003, for corresponding United Kingdom Application No. GB 0224035.6.

* cited by examiner

Primary Examiner—Edward Lefkowitz
Assistant Examiner—Octavia Davis
(74) Attorney, Agent, or Firm—Brinks Hofer Gilson & Lione

(57) ABSTRACT

An integrated engine combustion monitoring system that includes at least one structure comprising a light communication channel (LCC) and a sensor, which are embedded in a cylinder head gasket, for monitoring combustion composition, pressure, or temperature. The sensor and the LCC may be positioned between an air cavity or a material comprising a photorefractive gel or polymer. The sensor includes a sensing component that may have various shapes or configurations. The LCC comprises one or more materials, such as a polymer, which may be formed into a strand or other structural shape and incorporated into the cylinder head gasket. The other end of the LCC may be fabricated as part of one or more engine structures or it may be connected to other structures or components such as optical detectors or associated process control electronics.

27 Claims, 9 Drawing Sheets

ENGINE COMBUSTION MONITORING AND CONTROL WITH INTEGRATED CYLINDER HEAD GASKET COMBUSTION SENSOR

This application claims the benefit of U.S. Provisional Application No. 60/330,306 filed on Oct. 19, 2001, which is incorporated herein in its entirety.

FIELD OF THE INVENTION

The invention generally relates to an integrated sensor system for monitoring a combustion process or combustion chamber conditions inside an engine cylinder. In particular, the invention relates to an integrated sensor system for monitoring a combustion process or combustion chamber conditions using a light communication channel and a sensor embedded in a cylinder head gasket of an engine.

BACKGROUND OF THE INVENTION

An engine may encounter several combustion-related problems that can prevent it from running optimally. For example, the air and fuel mixture may be incorrect, or there may be contaminants in the air and fuel mixture. Engine problems may also arise when compression does not occur properly because the valves are not sealed tightly, the air and fuel mixture leaks past the piston during the compression stroke, or a gap forms between the cylinder and the cylinder head due to wear.

The cylinder head of an engine provides a number of functions such as sealing the top of the cylinders, providing a mounting for valve train components, providing guides and ports for the intake and exhaust valves, or providing the spark plugs access to the combustion chamber. Each recessed area above the piston in the cylinder head is a combustion chamber in which the air and fuel mixture burns. The intake of air and fuel mixture and the exit of combustion gases must be regulated to allow the engine to operate properly.

The cylinder head must be sealed tightly to contain the high pressure resulting from the combustion process. The cylinder head gasket, which is placed between the cylinder head and the engine block, functions to form the seal. Because of the severe environment in the engine's cylinder head, the components around the cylinder head must be able to withstand severe conditions such as temperatures that may vary from −40° C. to +250° C. The cylinder head gasket are also subjected to very high pressures. Monitoring or measuring in-cylinder parameters, particularly those relating to engine combustion, would facilitate the optimization of an engine's performance.

Strain gages can be used to measure or monitor changes in the gas mixture composition, pressure, or temperature in the combustion chamber. Various types of strain gages exist, but they generally convert mechanical motion into an electrical signal. In choosing the type of strain gage material to use, one has to consider material characteristics such as temperature sensitivity, stability, and resistance.

Traditional wired strain gages are usually difficult to assemble and are less reliable due to the number of wires involved. Signals passing through wires often cause cross talking and interference with the signal transmission in adjacent wires. Signals passing through wires also cause electromagnetic interference in adjacent wires unless some type of shielding is used. These factors cause signal distortion.

While optical fibers are sometimes used in place of wires or incorporated in a molded structure, optical fibers increase the cost of the electronic component system. Additionally, the integration of optical and electrical components is usually not suited for high volume manufacturing because of difficulties in assembly.

BRIEF SUMMARY OF THE INVENTION

The various embodiments of the invention utilize light channel technology that is connected to a sensor embedded in a cylinder head gasket. The invention provides means by which in-cylinder conditions such as gas mixture or charge composition can be monitored efficiently in real-time. In addition, the integration of various components according to the invention, in which one of the components is preferably a powertrain system, provides several benefits in terms of cost, weight, complexity, signal noise, reliability, space, and the so-called noise, vibration, and harshness (NVH) of the integrated system.

Integration in an engine cylinder head gasket of a sensor such as those for combustion composition, pressure, or temperature monitoring is achieved using novel light channel technology herein referred to as light communication channel (LCC) technology. One end of the LCC may be fabricated as part of other engine structures, such as a plastic intake manifold, and/or connected to other structures or components such as optical detectors, powertrain system, or other process control electronics.

In one aspect of the invention, an integrated engine combustion monitoring system is provided which comprises one or more structures comprising an LCC. A sensor, which is embedded in a cylinder head gasket near a cylinder wall, is connected to the one or more structures comprising an LCC. An electronic system receives and processes a signal received by the sensor, wherein the signal received by the sensor propagates through the LCC.

In another aspect of the invention, an integrated engine combustion monitoring system is provided comprising a sensor embedded in a cylinder head gasket that includes an optical window. An LCC comprises a polymer and is directly or indirectly connected to the optical window that has a tapered, optic bundle, or a ring configuration. An electronic system receives and processes a signal received by the sensor which is positioned near a cylinder wall. The signal received by the sensor propagates through the optical window and the LCC.

The present invention is also directed to an integrated engine combustion monitoring system comprising one or more structures comprising an LCC. The one or more structures comprising an LCC are positioned between the electronic system and a sensor. The sensor is embedded in a cylinder head gasket and connected to the one or more structures comprising an LCC. The sensor, which includes an IR window that has a tapered, optic bundle, or a ring configuration, detects infrared signals arising from combustion processes that occur in a combustion chamber. An electronic system receives and processes a signal received by the sensor.

The invention enables extremely high real-time data acquisition, efficient packaging and integration, low system complexity, and lower overall cost compared to traditional combustion sensing methods that use higher-cost sensors with complex integration that includes spark plugs, fuel injectors, or dedicated probes for each combustion chamber.

DETAILED DESCRIPTION OF THE PREFERRED EMBODIMENTS OF THE INVENTION

Figure 1:
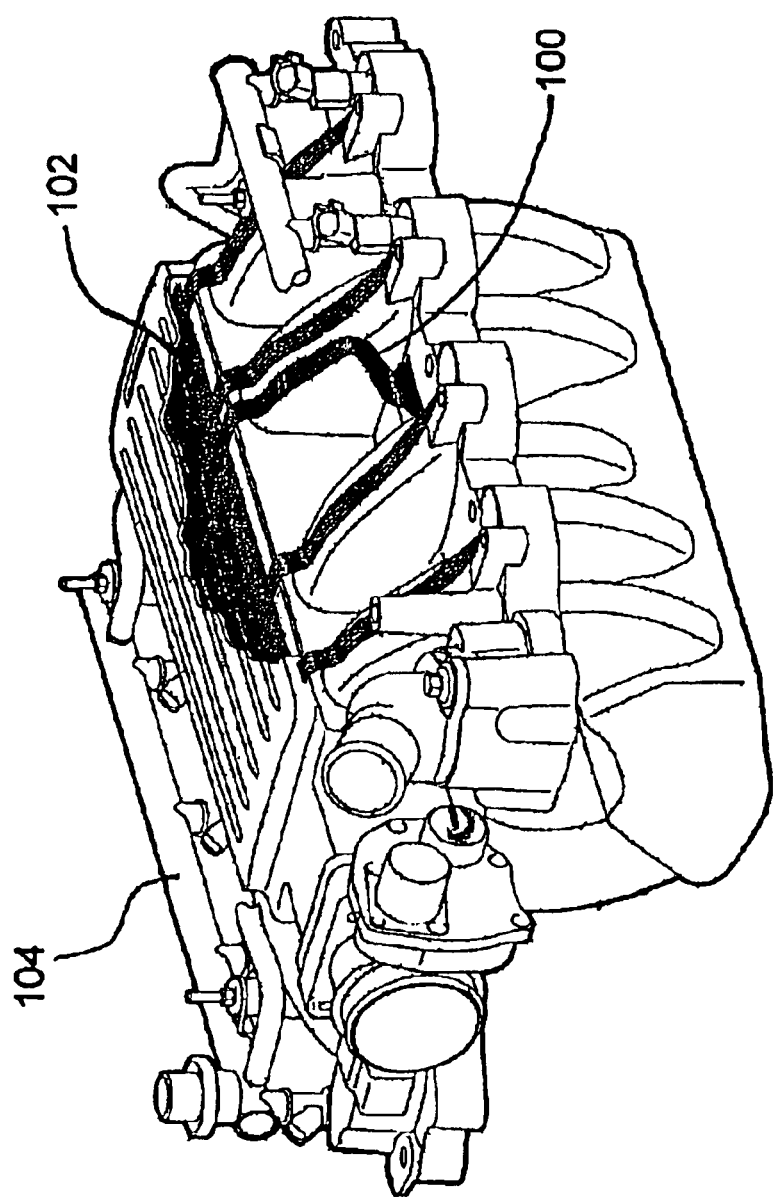
FIG. 1 shows an embodiment of the invention that includes a manifold assembly of an engine combustion monitoring and control system with an integrated cylinder head gasket combustion sensor.

The various aspects of the invention use novel, low cost high speed data transfer LCC technology, in addition to novel packaging or integration approaches involving an LCC. Means are provided by which in-cylinder conditions, such as charge composition, pressure, or temperature, can be monitored efficiently in real time. Sensors such as gas mixture composition, pressure or temperature sensors are integrated into the engine cylinder head gasket to allow the monitoring and control of in-cylinder combustion process or conditions.

Means for integrating various components, preferably including a process control system or a powertrain system, are also provided. The integration approaches of the present invention offer several benefits in terms of the cost, weight, complexity, signal noise, reliability, space, and the so-called noise, vibration, and harshness (NVH) of the integrated system.

In the various aspects of the invention, a system is provided that comprises at least one sensor that receives a signal emanating from a signal source such as a combustion chamber, and one or more structures comprising an LCC one end of which is connected to the sensor.

An LCC, otherwise known as light communication channel, is a structure made of at least one type of light-transmissive material formed into any shape that would allow transmission of a signal in the form of light from one point to another. An LCC is described in more detail below, but one of its characteristics is that it can be used as a substrate such as an optical substrate that can be formed into various shapes such as a rectangular slab or the shape of a part or the entirety of, for example, a main frame of an instrument panel display. As such, it can be used as a primary or secondary transmission means for a signal, such as an optical signal propagating from at least one signal source to at least one signal receiver, or it may encompass various electronic and/or optical components to allow a signal such as an optical signal to be directed to various electronic and/or optical components within the substrate, without having to resort to the use of conventional signal focusing means such as a beam splitter or focusing lens. An LCC may also assume other shapes such as a ring, strand, sheet, or ribbon.

Structures that comprise an LCC include an LCC in the form of strands or other structural shapes. Structures that comprise an LCC also include an LCC connected or fabricated with one or more components or systems such as a detector, light source, or an electronic system.

FIGS. 1–4 show different facets of a sensor that uses an LCC, such as an LCC strand, which is preferably embedded in a cylinder head gasket and connected or integrated with a powertrain system. Preferably, the LCC strands pass through the gasket and terminate at one or more locations within or around the perimeter of the cylinder. The LCC strands preferably terminate at a wall of each cylinder. Each termination point of each LCC strand may incorporate one or more sensors for monitoring parameters such as air and fuel mixture composition, pressure, temperature, and other parameters essential to optimal engine performance. Preferably, a sensor tip at the inner head gasket ring is constructed to shield the sensor from the harsh internal environment of the compression chamber.

FIG. 1 shows an embodiment of the invention that illustrates a manifold assembly incorporating an engine monitoring and control system with an integrated head gasket combustion sensor. The sensor, which is used for monitoring in-cylinder conditions such as charge composition, pressure or temperature, is integrated into the engine cylinder head gasket by embedding an LCC strand 100 in a cylinder head gasket. The LCC material can be made of polymers or other materials that allow the transmission of light of various or certain wavelengths.

The LCC 100 passes through the gasket and connects to the cylinder at one or more locations around the perimeter of the cylinder. The LCC 100 preferably terminates at the combustion chamber inner wall to allow monitoring of parameters such as combustion or gas mixture composition, temperature, or pressure.

The LCC may be attached, molded, or manufactured as part of an engine structure or component. Examples of those structures or components include optical sensors, intake manifold, printed circuit boards, flexible circuits, flatwire, or molding interconnect device (MID) circuits along the length or the termination points of the LCC. This configuration, or its variations, enables a mixed electronic technology solution for certain types of applications. Preferably, the LCC is connected to or integrated with a powertrain system 102.

Figure 2:
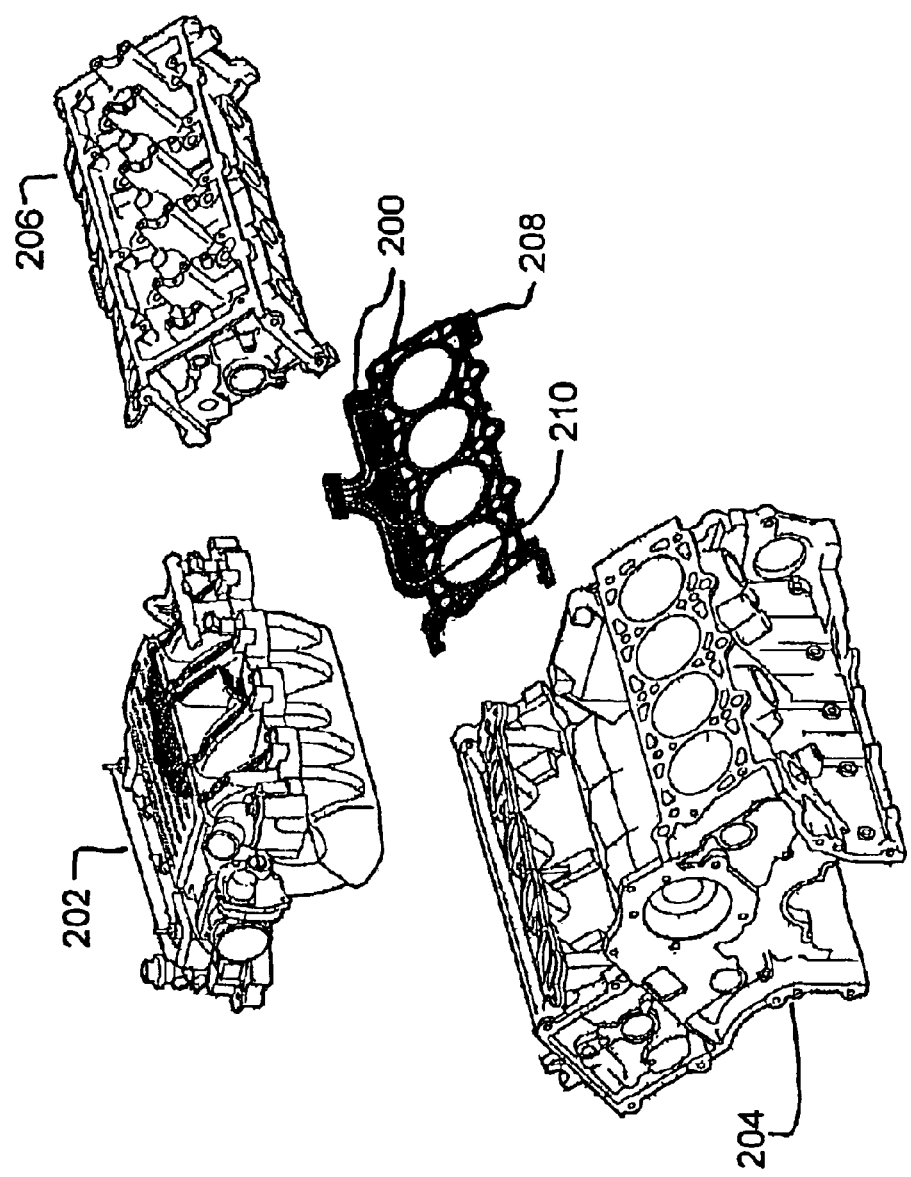
FIG. 2 shows key engine components of an engine combustion monitoring and control system with an integrated cylinder head gasket combustion sensor.

FIG. 2 shows various key engine components that include a cylinder head gasket that uses an LCC 200, an intake manifold with integrated electronics 202, an engine block 204, and a cylinder head 206. The sensors are incorporated in a cylinder head gasket 208 that is integrated with a powertrain system. The LCC 200 passes within the gasket 208 and reaches a cylinder of the combustion system at one or more locations around the perimeter of the cylinder. The LCC 200 terminates at a wall 210 of each cylinder. Each termination point of an LCC is constructed at a combustion chamber inner wall to allow monitoring of parameters such as air and fuel mixture composition, pressure, temperature, and other parameters essential to optimal engine performance.

Figure 3:
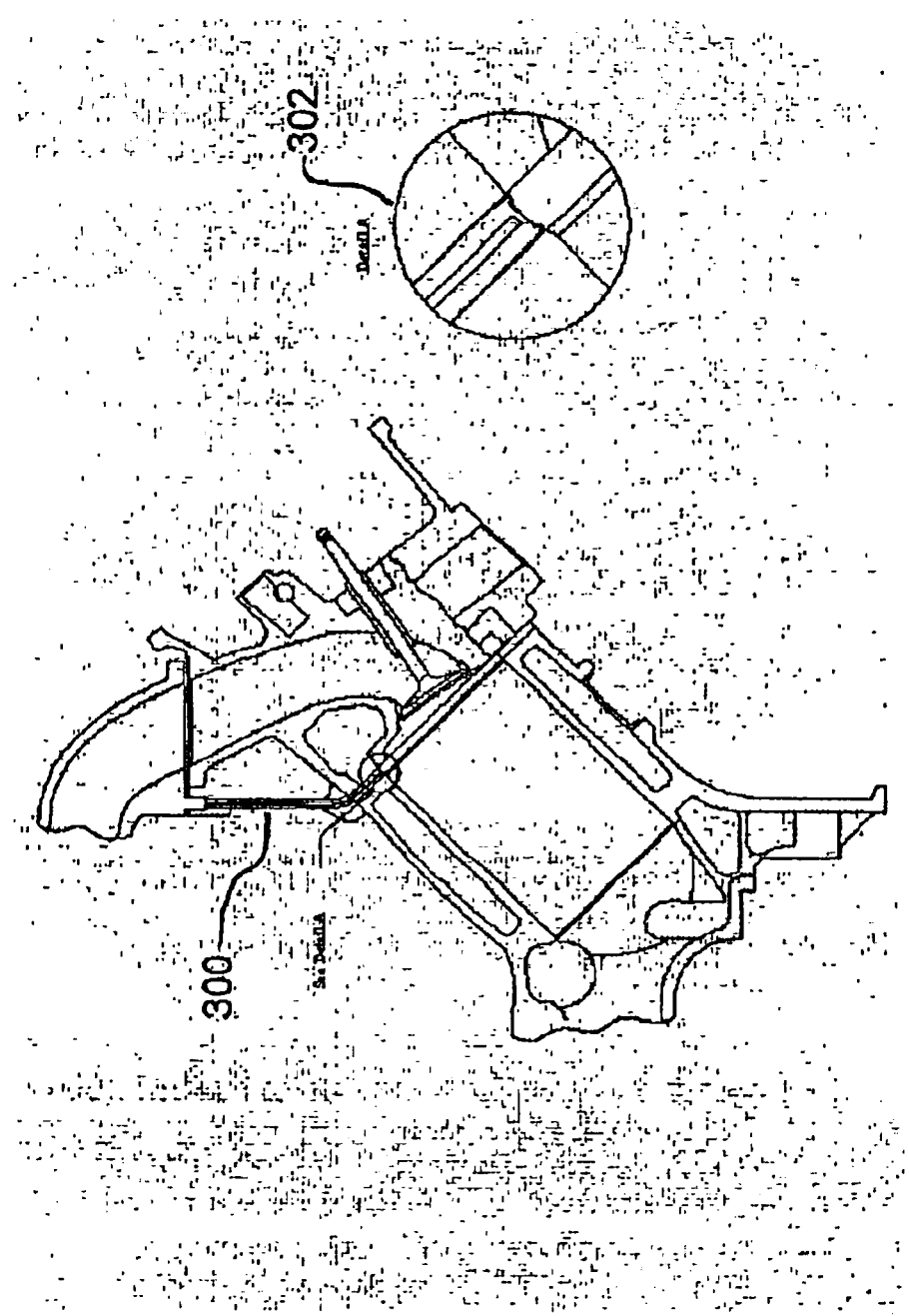
FIG. 3 shows an engine cylinder assembly cross-section of an engine combustion monitoring and control system with an integrated cylinder head gasket combustion sensor.

FIG. 3 shows a magnified view of a cylinder head gasket with an integrated LCC 300. Preferably, a sensor tip at the inner head gasket ring is constructed such that the sensor 302 is shielded from the severe internal environment of the compression chamber. Information obtained by the sensor regarding the monitored parameters is routed along the LCC to optical sensors and process control electronics. The LCC 300 may be connected to or manufactured as part of other engine structures such as intake manifolds.

Figure 4:
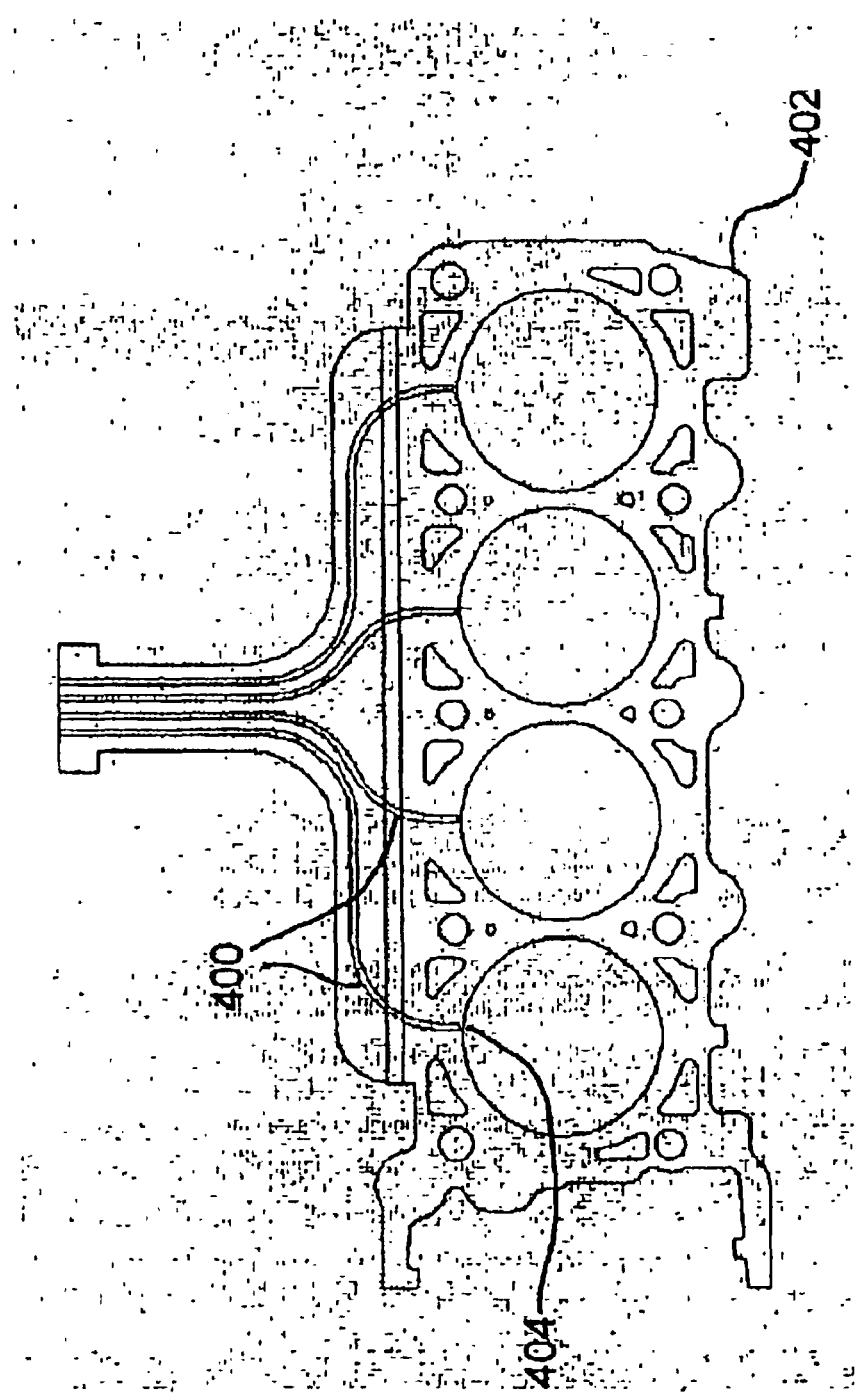
FIG. 4 shows a cylinder head gasket with integrated LCC.

FIG. 4 shows a view of a cylinder head gasket assembly. In FIG. 4, a sensor comprising a material such as a refractive polymer is preferably embedded in a cylinder head gasket 402 and positioned at near a cylinder wall 404. Preferably, the sensor is connected to an electronic system or a photo-detector via the LCC strands 400 through which a light signal travels. Preferably, the sensor receives a signal emanating from the combustion chamber. More preferably, the sensors pick up IR emissions produced from the ignition and combustion events in the combustion chamber. After leaving the sensor, the signal propagates through at least one of the LCC strands 400.

FIGS. 5–9 show various aspects of the invention. In these various aspects, the IR signals are received by a sensor that includes an optical window, preferably an IR window.

The sensor may comprise one or more materials that function as sensing components. The sensing components may be coated with a suitable reflective coating. Preferably, the one or more sensing components lie near or at a cylinder wall. In one aspect of the invention, the sensing component is in the form of a ring which is located inside a cylinder gasket and surrounds the cylinder.

The sensing components include an optical window that has a constant or varying diameter. The optical window may be made of a fused material such as an IR-grade fused silica, pure alumina (sapphire), zinc arsenide, IR-grade quartz, germanium, germanium-arsenic-selenium, or zinc selenide. The ends of the windows may be shaped to accommodate a suitable lens to enhance signal focusing and signal collection.

The sensing component is preferably connected to a flexible LCC material such as polycarbonate or polyethylene terephthalate (PET) through which a signal propagates. As used herein, "connected" means either directly connected, or indirectly connected with physical structures or gaps comprising air, for example, that are interposed between. An air cavity or a cavity filled with an optical refractive polymer or gel may be placed between the sensing component and the LCC. A groove may be milled into the gasket into which the material is placed and then sealed with an appropriate sealer. In fabricating the sensing components, at least one groove may be etched onto a gasket layer. The LCC materials are then added into the groove, and the gasket layer is further plated up to form a sealed assembly.

The LCC may be connected to at least one electronic system such as an analyzer or process control electronics where the IR signals undergo processing or analysis. The electronic system may be used to provide signal amplification and filtering functions. The electronic system may also be used for calibrating IR measurements such as providing a baseline measurement to account for background noise and other types of interferences.

Figure 5A:
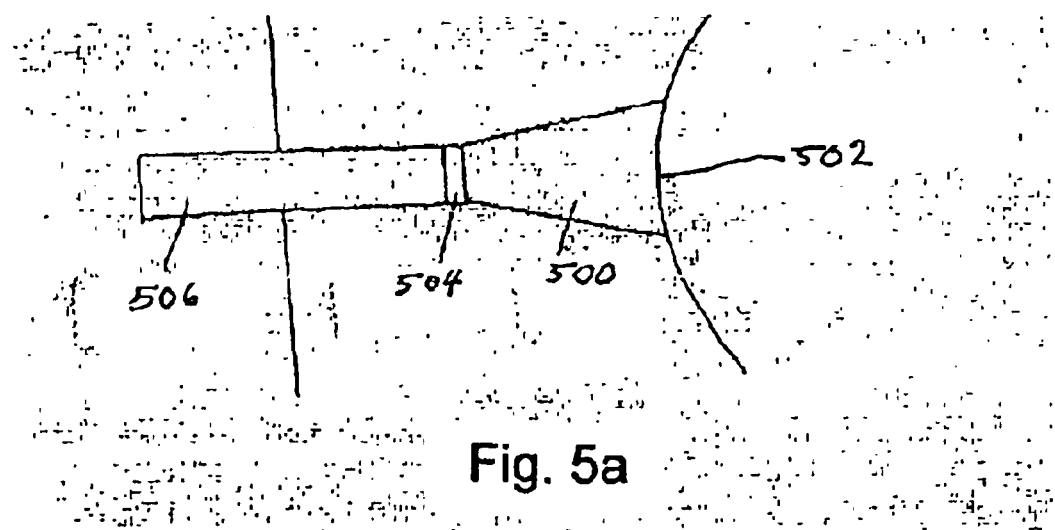
FIGS. 5a–b show two different configurations of an IR-emission sensing system that includes a tapered IR window.

FIG. 5a shows an IR-emission detection system that includes a tapered IR window 500 with an increasing diameter that reaches a maximum near a cylinder wall 502. As used herein, the term "near" means being located in the vicinity of an area, location, or object. The term "near" also means being located at a particular point or perimeter of an area, location, or object. An object or structure may be present between an area, location, or object that is "near" another area, location, or object. Thus, for example, an object that is "near" a cylinder wall can refer to an object that lies within the vicinity of a cylinder wall (whether or not an object or structure separates the object from the wall), or to an object that lies at or along a cylinder wall.

An advantage offered by the configuration shown in FIG. 5a is enhanced IR emission collection. Another end of the IR window is connected to a material 504, such as a photorefractive gel or polymer, which in turn is connected to an LCC 506. The IR signal received by the IR window 500 propagates through the LCC 506 which is preferably connected to an IR detector. The IR detector may be connected to an electronic system, such as a process control electronics, via an LCC bus. The LCC bus may also be connected to an electronic device such as an IR analyzer.

Figure 5B:
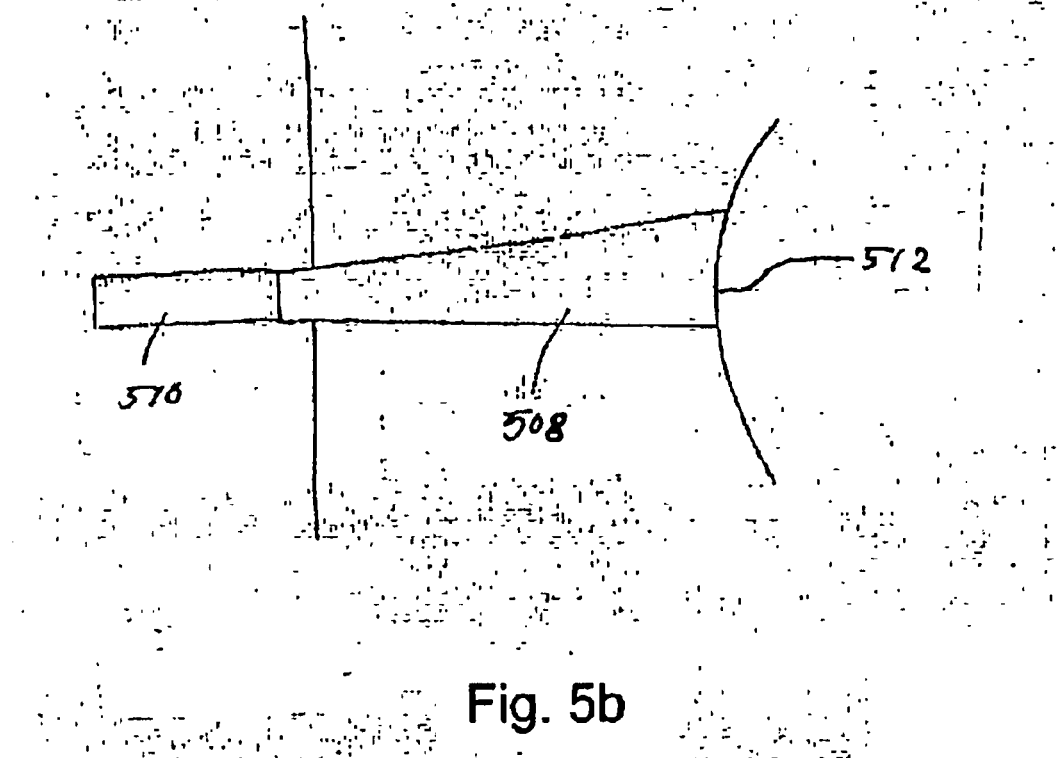

FIG. 5b shows an IR-emission detection system similar to the one shown in FIG. 5a. In FIG. 5b, a tapered IR window 508 terminates near a cylinder wall 512 and is directly connected to the LCC 510, rather than being separated by a material such as a gel or polymer. The IR window 508 is preferably made of at least one type of material such as IR-grade fused silica, pure alumina (sapphire), zinc arsenide, IR-grade quartz, germanium, germanium-arsenic-selenium, or zinc selenide.

Figure 6:
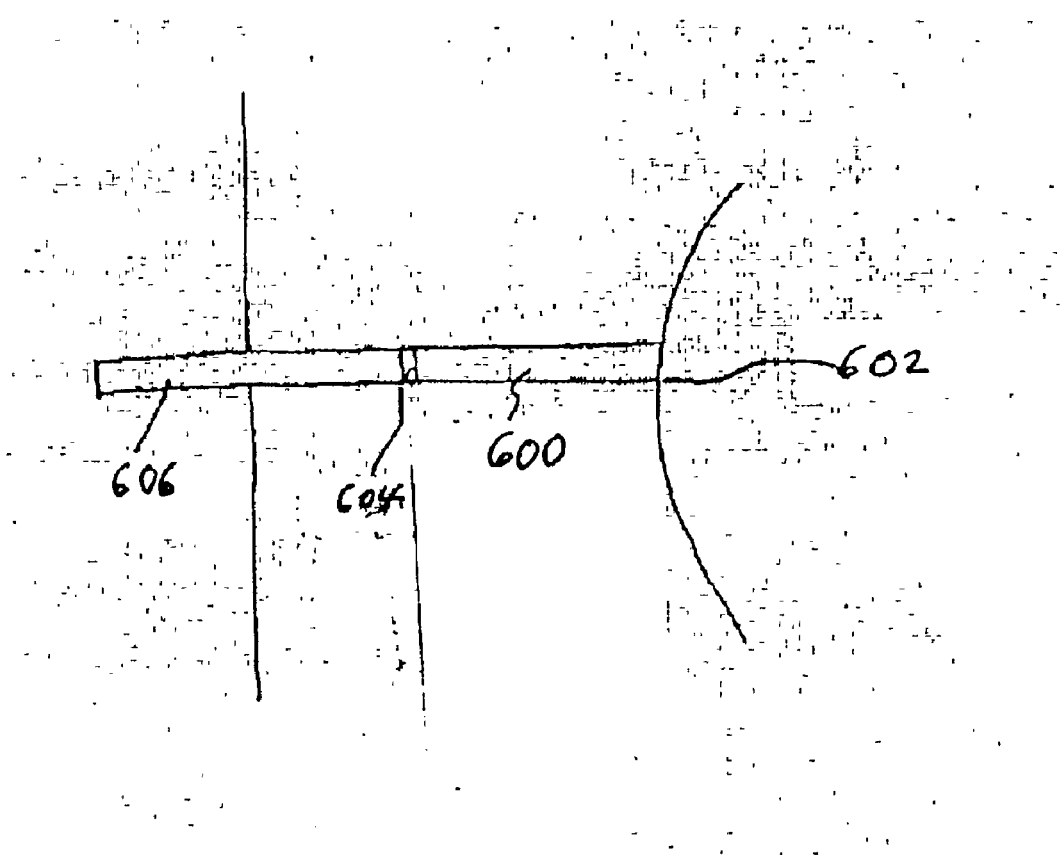
FIG. 6 shows an IR-emission detection system that incorporates an IR window with a constant diameter.

FIG. 6 shows an IR-emission detection system that includes an IR window 600 with a more or less constant diameter that terminates near a cylinder wall 602. The IR window is connected to a gel or a polymer 604 such as a photorefractive polymer. The gel or polymer is in turn connected to an LCC 606, which is preferably made of a flexible material. The LCC 606 is preferably connected to an IR detector. The IR detector may be connected to an electronic system, such as a process control electronics or an IR analyzer, via an LCC bus. The IR window may be made of one or more materials that include silica, sapphire, zinc arsenide, germanium, germanium-arsenic-selenium, and zinc selenide.

Figure 7:
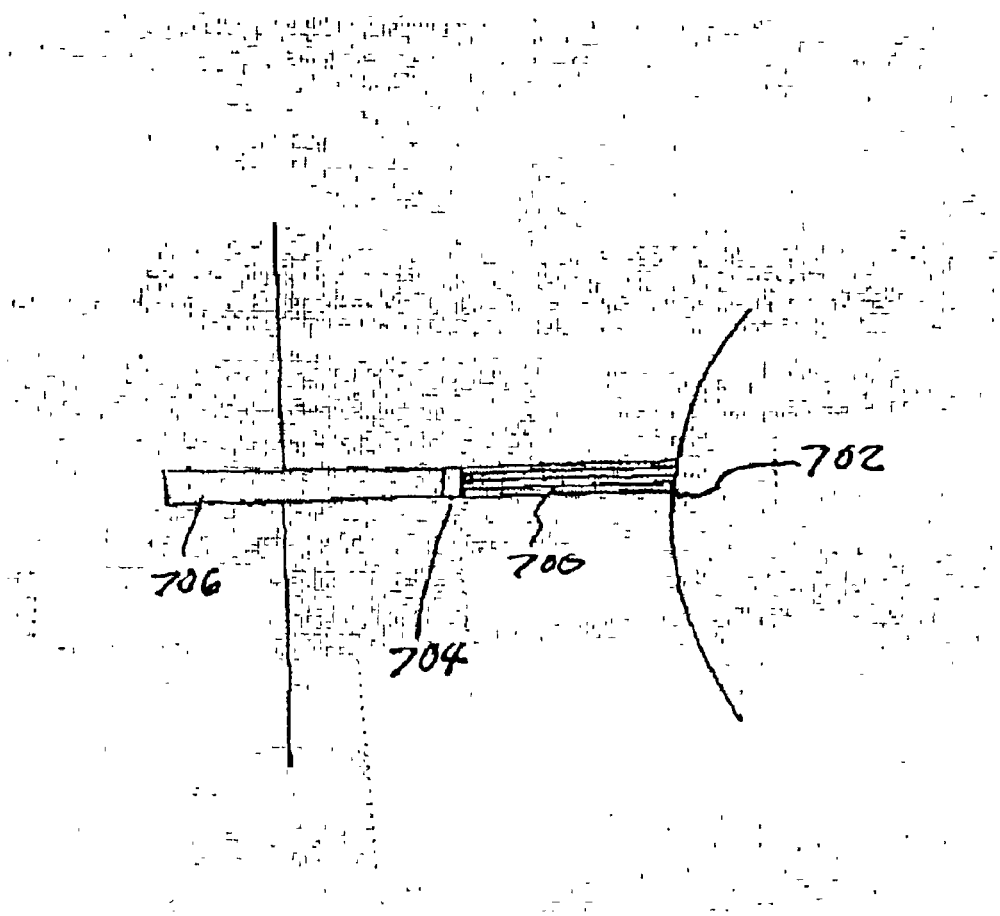
FIG. 7 shows an IR-emission detection system that includes an IR window in the form of an optic bundle.

FIG. 7 shows an IR-emission detection system that includes an optic bundle 700. The optic bundle 700 preferably comprises strands or layers of suitable IR sensing components such as silica, sapphire, zinc arsenide, germanium, germanium-arsenic-selenium, or zinc selenide. As shown in FIG. 7, the optic bundle has ends that terminate near a cylinder wall 702. The optic bundle may be connected to a refractive gel or polymer 704, which in turn is preferably connected to an LCC 706. The IR signal received by the optic bundle propagates through the LCC 706 which is directly or indirectly connected to an IR detector. Preferably, the IR detector is connected to an electronic system via an LCC bus. An example of such an electronic system is a process control electronics or an IR analyzer.

Figure 8:
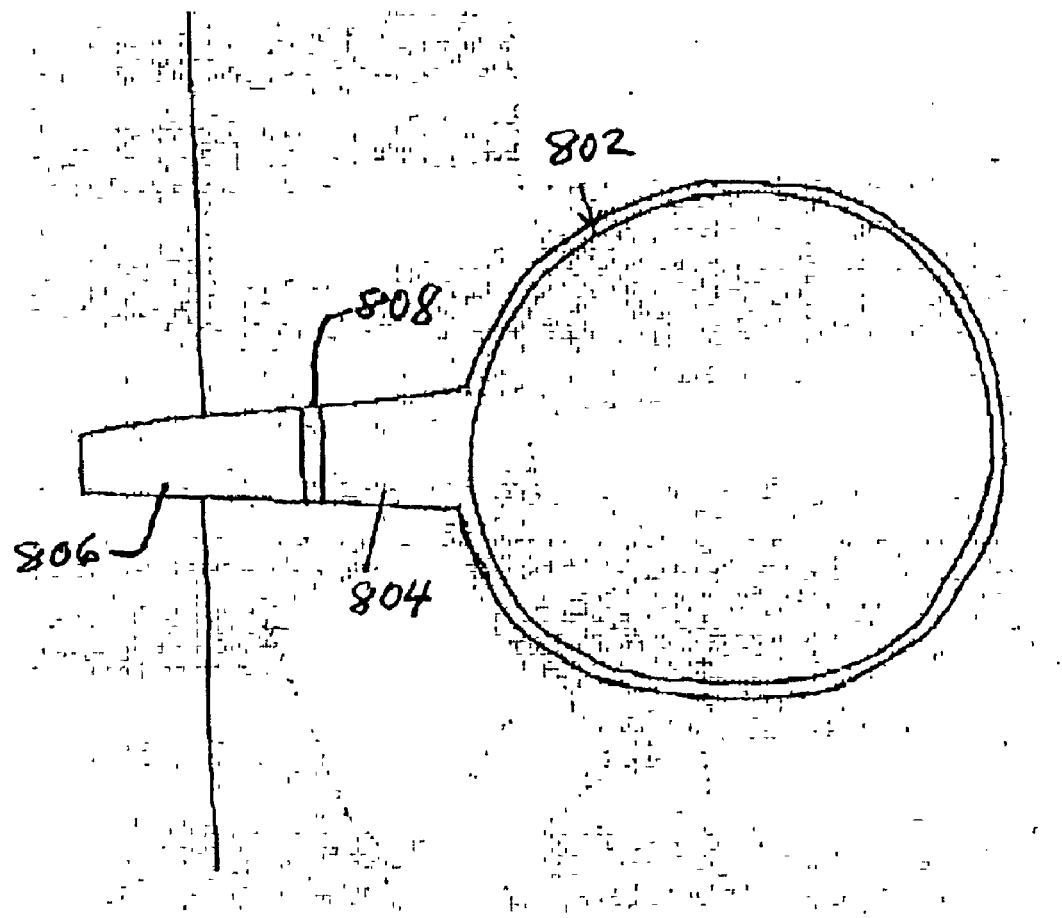
FIG. 8 shows an IR-emission detection system that includes an IR window in the form of a fused IR ring.

FIG. 8 shows an IR-emission detection system that includes an IR window 800 in the form of a fused IR ring 802. The fused IR ring may be made from one or more materials such as silica, sapphire, zinc arsenide, germanium, germanium-arsenic-selenium, or zinc selenide. The IR ring preferably surrounds the perimeter of a cylinder wall. This configuration offers the advantage of enhanced signal collection efficiency. Part of the IR ring 804 extends outward and may be connected to an LCC 806 via an air cavity or a material 808 made of an optical polymer or gel. Alternatively, the IR window may be directly connected to the LCC 806. The LCC 806 is preferably made of a flexible material such as polycarbonate or PET.

Figure 9A:
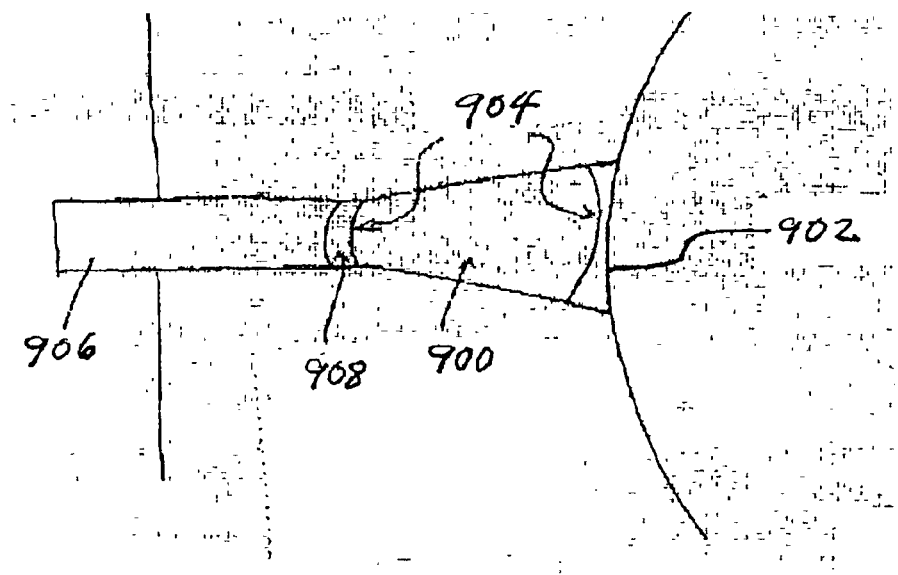
FIGS. 9a–b show an IR-emission detection system that includes a lens and a diaphragm.

FIG. 9a shows an IR-emission detection system that includes a tapered IR window 900 with a diameter that reaches a maximum near a cylinder wall 902. In this configuration, at least one of the ends of the IR window 900 is either formed into or connected to a lens 904. The lens 904 allows improved focusing and signal collection. A second lens 906 may be placed between the other end of the IR window 900 and an LCC 908 via a piece of material 910 such as a photorefractive gel or polymer. Alternatively, the IR window 900 or the second lens 906 may be connected to the LCC 908 via an air cavity. The LCC 908 is preferably made of a flexible material such as polycarbonate or PET.

Figure 9B:
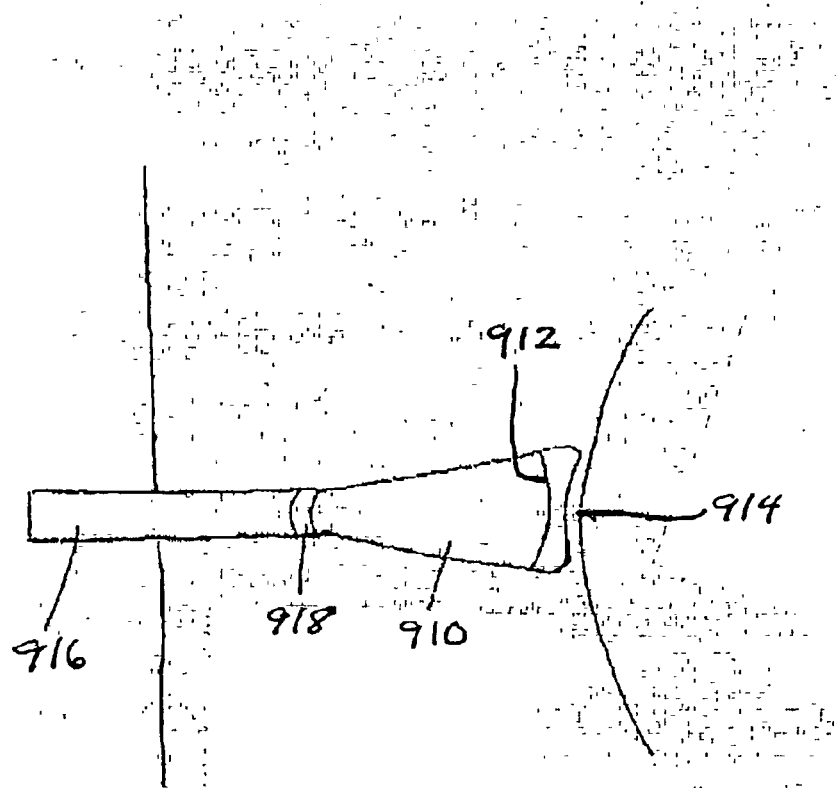

FIG. 9b shows an IR-emission detection system that includes an IR window 910 that incorporates a diaphragm 912 for monitoring combustion conditions. The diaphragm 912, which is connected to the IR-window 910, is positioned near a cylinder wall 914. The diaphragm 912 alters the optical signal by, for example, varying the intensity of an optical signal collected by the IR window. The IR window 910, which may be made of material such as fused silica, has an increasing diameter that reaches a maximum near the cylinder wall 914. The other end of an IR-window 910 is connected to a piece of material 918 such as a photorefractive gel or polymer which in turn is connected to the LCC 916. Preferably, the LCC 916 is made of a flexible material such as polycarbonate or PET. The LCC 916 is preferably connected to a photodetector such as an IR detector. The IR detector may be connected to an electronic device, such as an analyzer or a process control electronics, wherein a detected IR signal undergoes processing or conditioning. The electronic device may also be used to direct the detected IR signal to other parts of an engine for further processing or analysis.

The LCC preferably comprises a polymeric material. The polymeric material may be a photorefractive polymer. Suitable materials that comprises the LCC include polypropylene, polyethylene, PET, polyisobutylene, polyacrylonitrile, poly(vinyl chloride), poly(methyl metacrylate), silica, polycarbonate, or acrylic.

The LCC may comprise one or more transparent or translucent materials. For example, the LCC may comprise a first material transparent to a first frequency of the signals and a second material transparent to a second frequency of the signals.

The LCC may have different configurations such as curvilinear, wavy, or asymmetrical. The LCC may also have various dimensions including non-uniform thickness, width, and length. Preferably, the LCC is made of a moldable material so it can be formed to a desired shape. The LCC may be connected to or integrated with structures such as printed circuit boards, flexible substrates, flatwire, and MID circuits.

The LCC may have a reflective coating on one or more surfaces. In one aspect of the invention, the reflective coating covers the entire surface or substantially the entire surface of the LCC strands except for the portions of the surface where the signal source and detector are connected to the LCC. The reflective coating may comprise any material that reflects signals in the LCC. The reflective coating includes one or more alloys or metals such as aluminum, copper, silver, or gold. The LCC may have a higher refractive index than the reflective coating. Reflective or absorptive materials may separate multiple LCC's.

The sensor may include one or more piezoelectric or piezooptic materials. The piezoelectric materials may comprise silicon or germanium. These materials typically have greater sensitivity than metallic wire or foil strain gages. Preferably, the sensor is filled with a suitable refractive polymer or other suitable material or combination of materials to enhance the change in sensing with piston firing. The sensor may include or be connected to a detector such as a photodetector.

The signals may be a combination of electromagnetic frequencies, and may be modulated or coded. If necessary, the signals may be amplified to permit longer transmission distances. The signal preferably essentially diffuses throughout the entire volume of the LCC. As used herein, "essentially diffuses" includes signal propagation in various directions within the LCC unless the signal source or another component blocks the signal or the surface of the LCC reflects the signal. The signals may propagate along the same or opposite directions. The detectors or receivers may be positioned in any suitable location on the surface of the LCC to receive one or more signals. Multiple detectors may receive signals from a single signal source.

Preferably, at least one of the detectors is an electromagnetic radiation receiving or collection device such as a photodiode or an RF detector. The detectors may receive or collect one or more signals from the LCC. Preferably, the detectors provide an output signal to the electronic component system in response to the signal from the LCC. The detectors preferably have one or more frequency specific filters to reduce or eliminate interference from signals with different frequencies. The frequency specific filter selectively allows a particular detector to receive a signal having a particular frequency or a narrow range of frequencies. The detector includes, but is not limited to, photodiodes, microchannel plates, photomultiplier tubes, or combination of detectors.

The use of LCC, or structures comprising an LCC, and its integration into the gasket materials can be extended into applications of other similar systems where gaskets or seals are desired, such as vehicle brakes, vehicle cooling systems, commercial air conditioning systems, jet engines, or manufacturing processes or equipment. These features make the various embodiments of the invention useful for control applications in industries such as automotive and consumer products industries.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except as necessitated by the accompanying claims and their equivalents.

What is claimed is:

1. An integrated engine combustion monitoring system comprising:
    at least one structure comprising an LCC;
    a sensor embedded in a cylinder head gasket near a cylinder wall and connected to the at least one structure comprising an LCC, the sensor comprising an IR window receiving an IR signal, the at least one structure comprising an LCC propagating the IR signal; and
    an electronic system that receives and processes the IR signal received by the sensor, the electronic system including an IR detector detecting the IR signal.

2. The integrated engine combustion monitoring system of claim 1, wherein the LCC comprises a polymer.

3. The integrated engine combustion monitoring system of claim 1, wherein the LCC comprises polypropylene, polyethylene, polyethylene terephthalate, silica, polycarbonate, or acrylic.

4. The integrated engine combustion monitoring system of claim 1, wherein the electronic system further includes an IR analyzer for analyzing the IR signal.

5. The integrated engine combustion monitoring system of claim 1, wherein the IR window has a tapered, constant diameter, or a ring configuration.

6. The integrated engine combustion monitoring system of claim 1, wherein the IR window is made of at least one material selected from the group consisting of fused silica, alumina, zinc arsenide, quartz, germanium, germanium-arsenic-selenium, and zinc selenide.

7. The integrated engine combustion monitoring system of claim 6, wherein the material of the IR window is an IR grade material.

8. The integrated engine combustion monitoring system of claim 1, wherein a material comprising a photorefractive polymer or a photorefractive gel lies between the IR window and the LCC and traransmits the IR signal from the IR window to the LCC.

9. The integrated engine corn buatlon monitoring system of claim 1, wherein the IR window includes a first end near the cylinder wall and a second end opposite the first end, and wherein the second end includes a lens, the IR signal passing through the IR window and the lens LCC.

10. The integrated engine combustion monitoring system of claim 9, wherein the second end of the IR window is formed into a lens.

11. The integrated engine combustion monitoring system of claim 9, wherein the first end of the IR window includes a second lens through which the IR signal passes.

12. The integrated engine combustion monitoring system of claim 9, wherein the IR window is tapered such that the first end is large than the second end.

13. An integrated engine combustion monitoring system comprising:
    a sensor embedded in a cylinder head gasket that includes an optical window,
    an LCC which comprises a polymer and is connected to the optical window, and an electronic system that receives and processes a signal received by the sensor,
    wherein the sensor is positioned near a cylinder wall, and the optical window has a tapered shape that narrows as the optical window extends away from the cylinder wall, and wherein the signal received by the sensor propagates through the optical window and the LCC.

14. The integrated engine combustion monitoring system of claim 13, wherein the optical window is an IR window and the signal is an IR signal.

15. An Integrated engine combustion monitoring system of claim 14, wherein the electronic system includes an IR detector detecting the IR signal.

16. The integrated engine combustion monitoring system of claim 13, wherein the LCC comprises polypropylene, polyethylene, polyethylene terephthalate, silica, polycarbonate, or acrylic.

17. The integrated engine combustion monitoring system of claim 13, wherein the optical window is made of at least one material selected from the group consisting of fused silica, alumina, zinc arsenide, quartz, germanium, germanium-arsenic-selenium, and zinc selenide.

18. The integrated engine combustion monitoring system of claim 13, wherein the optical window is connected to the LCC via a material comprising a photorefractive polymer or a photorefractive gel.

19. The integrated engine combustion monitoring system of claim 13, further comprising a lens or a diaphragm that lies near the narrow end of the optical window.

20. The integrated engine combustion monitoring system of claim 19, wherein the narrow end of the optical window is formed into the lens.

21. An integrated engine combustion monitoring system of claim 19, further comprising a second lens that lies near the wide end of the optical window.

22. An integrated engine combustion monitoring system comprising:
    at least one structure comprising an LCC;
    a sensor embedded in a cylinder head gasket near a cylinder wall and connected to the at least one structure comprising an LCC; and
    an electronic system that receives and processes a signal received by the sensor, the electronic system in communication with the at least one structure comprising an LCC;
    wherein, the sensor includes an IR window having a ring-shaped extending around the periphery of the cylinder wall, and wherein the sensor detects infrared signals arising from a combustion event in a combustion chamber.

23. The integrated engine combustion monitoring system of claim 22, the LCC comprises polypropylene, polyethylene, polyethylene terephthalate, silica, polycarbonate, or acrylic.

24. The integrated engine combustion monitoring system of claim 22, wherein the IR window is made of at least one materiel selected from the group consisting of fused silica, alumina, zinc arsenide, quartz, germanium, germanium-arsenic-selenium, and zinc selenide.

25. The integrated engine combustion monitoring system of claim 22, wherein the IR window is connected to an LCC via a material comprising a photorefractive polymer or a photorefractive gel.

26. The integrated engine combustion monitoring system of claim 22, further comprising a lens or a diaphragm that lies adjacent to the IR window.

27. The integrated engine combustion monitoring system of claim 22, wherein at least one end of the optical window is formed into a lens.

* * * * *

UNITED STATES PATENT AND TRADEMARK OFFICE
CERTIFICATE OF CORRECTION

PATENT NO. : 6,810,723 B2
DATED : November 2, 2004
INVENTOR(S) : Myron Lemecha et al.

It is certified that error appears in the above-identified patent and that said Letters Patent is hereby corrected as shown below:

Column 9,
Line 43, delete "Integrated" and substitute -- integrated -- in its place.

Column 10,
Line 28, immediately after "wherein" delete "," (comma).
Line 29, delete "ring-shaped" and substitute -- ring-shape -- in its place.

Signed and Sealed this

Third Day of May, 2005

JON W. DUDAS
*Director of the United States Patent and Trademark Office*